United States Patent
Wong et al.

(10) Patent No.: US 8,085,653 B2
(45) Date of Patent: Dec. 27, 2011

(54) BEAMFORMING WITH NULLING TECHNIQUES FOR WIRELESS COMMUNICATIONS NETWORKS

(75) Inventors: Wendy C. Wong, San Jose, CA (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1142 days.

(21) Appl. No.: 11/852,277

(22) Filed: Sep. 8, 2007

(65) Prior Publication Data

US 2009/0067375 A1 Mar. 12, 2009

(51) Int. Cl.
 *H04W 4/00* (2009.01)
 *H04M 1/00* (2006.01)
 *H04L 27/28* (2006.01)
 *H04J 11/00* (2006.01)

(52) U.S. Cl. .......... 370/208; 370/328; 375/260; 455/69; 455/562.1

(58) Field of Classification Search ................. None
 See application file for complete search history.

(56) References Cited

U.S. PATENT DOCUMENTS

| | | | |
|---|---|---|---|
| 7,069,009 B2 * | 6/2006 | Li et al. | 455/446 |
| 2006/0203891 A1 * | 9/2006 | Sampath et al. | 375/132 |
| 2006/0210001 A1 * | 9/2006 | Li et al. | 375/346 |
| 2008/0107035 A1 * | 5/2008 | Zhu et al. | 370/241 |
| 2010/0020702 A1 | 1/2010 | Wong et al. | |
| 2010/0208712 A1 * | 8/2010 | Wax et al. | 370/338 |

* cited by examiner

*Primary Examiner* — Hassan Phillips
*Assistant Examiner* — Marcus Smith
(74) *Attorney, Agent, or Firm* — Kacvinsky Daisak, PLLC

(57) ABSTRACT

Beamforming with nulling techniques for wireless communications networks are disclosed. For example, an apparatus may include a beamforming module and a weight determination module. The beamforming module applies beamforming weights to a downlink user channel with a first mobile station. The weight determination module determines the beamforming weights based on user channel information and interfering channel information. This user channel information is received from the first mobile station and includes characteristics of the downlink user channel. However, the interfering channel information includes characteristics of one or more downlink interfering channels received by one or more further mobile stations. These downlink interfering channels are associated with transmissions across the downlink user channel with the first mobile station.

17 Claims, 6 Drawing Sheets

BEAMFORMING WITH NULLING TECHNIQUES FOR WIRELESS COMMUNICATIONS NETWORKS

BACKGROUND

Transmit beamforming with nulling techniques have been considered for wireless networks to increase system performance. For instance, such techniques have been considered for Worldwide Interoperability for Microwave Access (WiMAX) networks and planned WiMAX II networks. More particularly, such techniques have been considered for cell edge users that are stationary or have low mobility.

In interference limited cellular deployments, beamforming with nulling may advantageously attenuate interfering transmissions while boosting power to desired user devices. As a result, signal to interference-plus-noise ratio (SINR) performance may be improved for communications with user devices.

Transmit beamforming with nulling techniques increase system complexity. For instance, such techniques may require base stations to provide multiple antennas and processing capabilities that determine the beamforming weights applied to these antennas. In addition, base stations may need to obtain certain channel-related information to employ these techniques.

DETAILED DESCRIPTION

Figure 1:
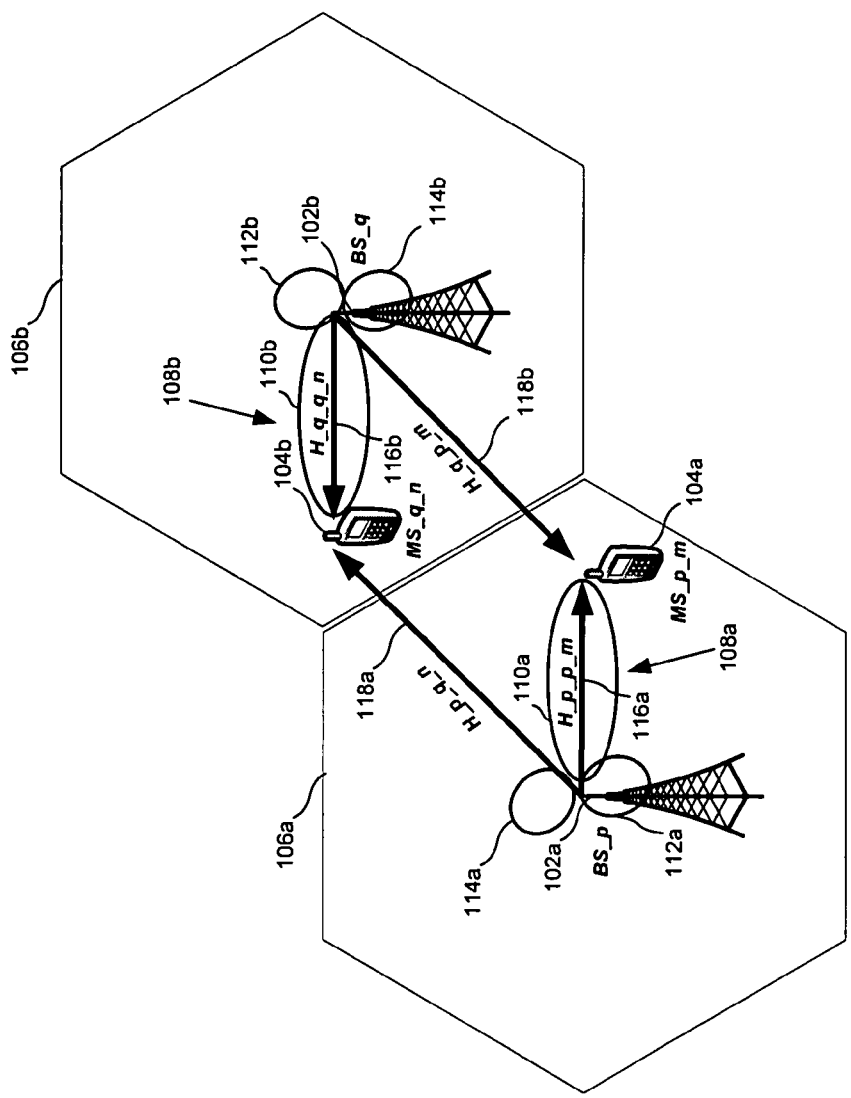
FIG. 1 illustrates an exemplary operational scenario.

Various embodiments may be generally directed to beamforming techniques for wireless communications systems. Current wireless communications systems that use time division duplexing (TDD) transmission schemes may employ beamforming with nulling techniques. This is because beamforming weights for downlink transmissions may be derived from uplink transmissions. However, for frequency division duplexing (FDD) systems, such beamforming weight derivation is not possible. This is because the uplink and downlink channels in FDD systems are very different.

Thus, in embodiments, systems (e.g., systems employing FDD transmission schemes) may perform beamforming with nulling through the performance of downlink channel information received by mobile stations (e.g., cell edge mobile stations). This downlink channel information includes characteristics of downlink user channels and downlink interfering channels. The mobile stations send the measurements to their serving base stations. Further, the base stations may exchange with each other (across a backbone network) the interfering channel information that they receive. Through this downlink channel information, base stations may calculate beamforming weights for their mobile stations (e.g., for their cell edge mobile stations).

In addition, embodiments employ beamforming pilot reuse techniques to allow mobile stations to perform downlink user channel and downlink interfering channel measurements.

In embodiments, an apparatus may include a beamforming module and a weight determination module. The beamforming module applies beamforming weights to a downlink user channel with a first mobile station. The weight determination module determines the beamforming weights based on user channel information and interfering channel information. This user channel information is received from the first mobile station and includes characteristics of the downlink user channel. However, the interfering channel information includes characteristics of one or more downlink interfering channels received by one or more further mobile stations. These downlink interfering channels are associated with transmissions across the downlink user channel with the first mobile station.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain arrangement by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment" or "in an embodiment" in various places in the specification are not necessarily all referring to the same embodiment.

FIG. 1 is a diagram of an exemplary operational environment 100. This environment includes multiple base stations 102a-b, and multiple mobile stations 104a-b. As shown in FIG. 1, an idealized coverage area (or cell) 106 is associated with each of base stations 102a-b. In particular, a coverage area 106a is associated with base station 102a and a coverage area 106b is associated with base station 102b.

Base station 102a provides communications service to mobile station 104a, and base station 102b provides communications service to mobile station 104b. This service involves the exchange of wireless signals. Such signals may be modulated according to orthogonal frequency division multiplexing (OFDM) and/or orthogonal frequency division multiple access (OFDMA) techniques. Accordingly, base stations 102a-b and mobile stations 104a-b may operate in an IEEE 802.16 WiMAX system or WiMAX II system. The embodiments, however, are not limited to such modulation techniques or systems.

Each of base stations 102a-b includes multiple antennas. Through these antennas, each of base stations 102a-b may employ adaptive transmit beamforming with nulling techniques to improve the strength of signals transmitted to mobile stations it serves and to attenuate the strength of signals transmitted to mobile stations serviced by other base stations. For instance, FIG. 1 shows that base station 102a forms a beam 108a for communications with mobile station 104a. Similarly, base station 102b forms a beam 108b for communications with mobile station 104b.

Each of these beams may include a main lobe and multiple side lobes. For purposes of illustration, FIG. 1 shows beam 108a having a main lobe 110a, a first side lobe 112a, and a second side lobe 114a. Similarly, FIG. 1 shows beam 108b having a main lobe 110b, a first side lobe 112b, and a second side lobe 114b. These beams are shown for purposes of illustration and not limitation. Therefore, other beam patterns may be employed.

In embodiments, base stations employ such adaptive beamforming with nulling techniques for communications with mobile stations that are prone to suffer from interference transmitted by other base stations. These mobile stations are usually located near the boundaries of their corresponding cells 106. Hence, such mobile stations are referred to as "cell edge stations". In the example of FIG. 1, mobile stations 104a and 104b are cell edge stations.

In contrast, mobile stations that are located more towards the center of their corresponding cells 106 are referred to as "central stations". These mobile stations do not typically experience significant interference from other base stations. Thus, in embodiments, adaptive beamforming with nulling techniques are not performed for communications with central stations.

Accordingly, FIG. 1 shows that base station 102a may employ beamforming with nulling techniques such that beam 108a points its main lobe 110a towards mobile station 104a and a null or significant signal attenuation towards mobile station 104b. Similarly, FIG. 1 shows that base station 102b may employ beamforming techniques such that beam 108b points its main lobe 110b towards mobile station 104b and a null or significant signal attenuation towards mobile station 104a. Such techniques are referred to as adaptive downlink beamforming with nulling. This is because base stations form beam patterns that enhance coverage to mobile stations they serve and diminish coverage to mobile stations that they do not serve.

As a result of these characteristics, base stations 102a and 102b may simultaneously transmit to mobile stations 104a and 104b, respectively. However, through the directivity characteristics of beams 108a and 108b, signal to interference and noise ratios (SINRs) of these transmissions (as received by mobile stations 104a and 104b) are advantageously increased. In turn, this may advantageously increase the data rate associated with transmissions to these mobile stations.

In the context of WiMAX, WiMAX II, and cellular systems, such transmission may occur during a downlink subframe. More particularly, each cell edge station may receive transmissions during an allocated resource, which can span over some time interval (e.g., a time slot) and some frequency interval (e.g., a subchannel) allocated to the cell edge station. During this allocated resource, the base station may employ downlink transmit beamforming with nulling to provide improved SINR performance (and thus data rates) for the cell edge station.

As shown in FIG. 1, various links or channels exist between base stations 102a-b and mobile stations 104a-b. These channels include downlink user channels 116a-b and downlink interfering channels 118a-b.

User channels 116a-b are between base stations and the mobile stations that they serve. For instance, user channel 116a is between base station 102a and mobile station 104a. Similarly, user channel 116b is between base station 102b and mobile station 104b. FIG. 1 shows that user channels 116a and 116b occur through beams 108a and 108b, respectively.

In contrast, interfering channels 118a and 118b are between base stations and mobile stations that they do not serve. For instance, interfering channel 118a is between base station 102a and mobile station 104b. Similarly, interfering channel 118b is between base station 102b and mobile station 104a. FIG. 1 shows that interfering channels 118a and 118b occur through nulls formed by base station 102a and 102b, respectively. These nulls are associated with beams 108a and 108b.

As shown in FIG. 1, an alphabetic notation is used to denote base stations 102, mobile stations 104, user channels 116, and interfering channels 118. For instance, base stations 102a and 102b are also denoted as BS_p and BS_q, respectively. Further, FIG. 1 also denotes mobile stations 104a and 104b as MS_p_m and MS_q_n, respectively. In this mobile station notation, m and n are mobile station identifiers, and p and q indicate the base stations (BS_p and BS_q) that serve these mobile stations.

In addition, FIG. 1 also denotes user channels 116a and 116b as H_p_p_m and H_q_q_n, respectively. H_p_p_m indicates a channel from MS_p_m to BS_p. Similarly, H_q_q_n indicates a channel from MS_q_n to BS_q.

Moreover, interfering channels 118a and 118b are indicated as H_p_q_n and H_q_p_m, respectively. H_p_q_n indicates a channel from MS_q_n to BS_p. This is an interfering channel because BS_p does not serve MS_q_n. Likewise, H_q_p_m indicates a channel from MS_p_m to BS_q. This is also an interfering channel because BS_q does not serve MS_p_m.

A description of the aforementioned channels is provided below in Table 1. Moreover, a notation for the frequency responses of these channels is provided in the rightmost column of this table. These frequency responses are M×N matrices, where M is the number of beamforming antennas that each of base stations 102a and 102b employ, and N is the number of antennas that each of mobile stations 104a and 104b employ.

TABLE 1

| Channel | Description | Channel Notation | Frequency Response Notation |
| --- | --- | --- | --- |
| User channel 116a | Channel from base station 102a (BS_p) to mobile station 104a (MS_p_m) | H_p_p_m | $H_{p\_p\_m}$ |
| User channel 116b | Channel from base station 102b (BS_q) to mobile station 104b (MS_q_n) | H_q_q_n | $H_{q\_q\_n}$ |
| Interfering channel 118a | Channel from base station 102a (BS_p) to mobile station 104b (MS_q_n) | H_p_q_n | $H_{p\_q\_n}$ |
| Interfering channel 118b | Channel from base station 102b (BS_q) to mobile station 104a (MS_p_m) | H_q_p_m | $H_{q\_p\_m}$ |

Figure 2:
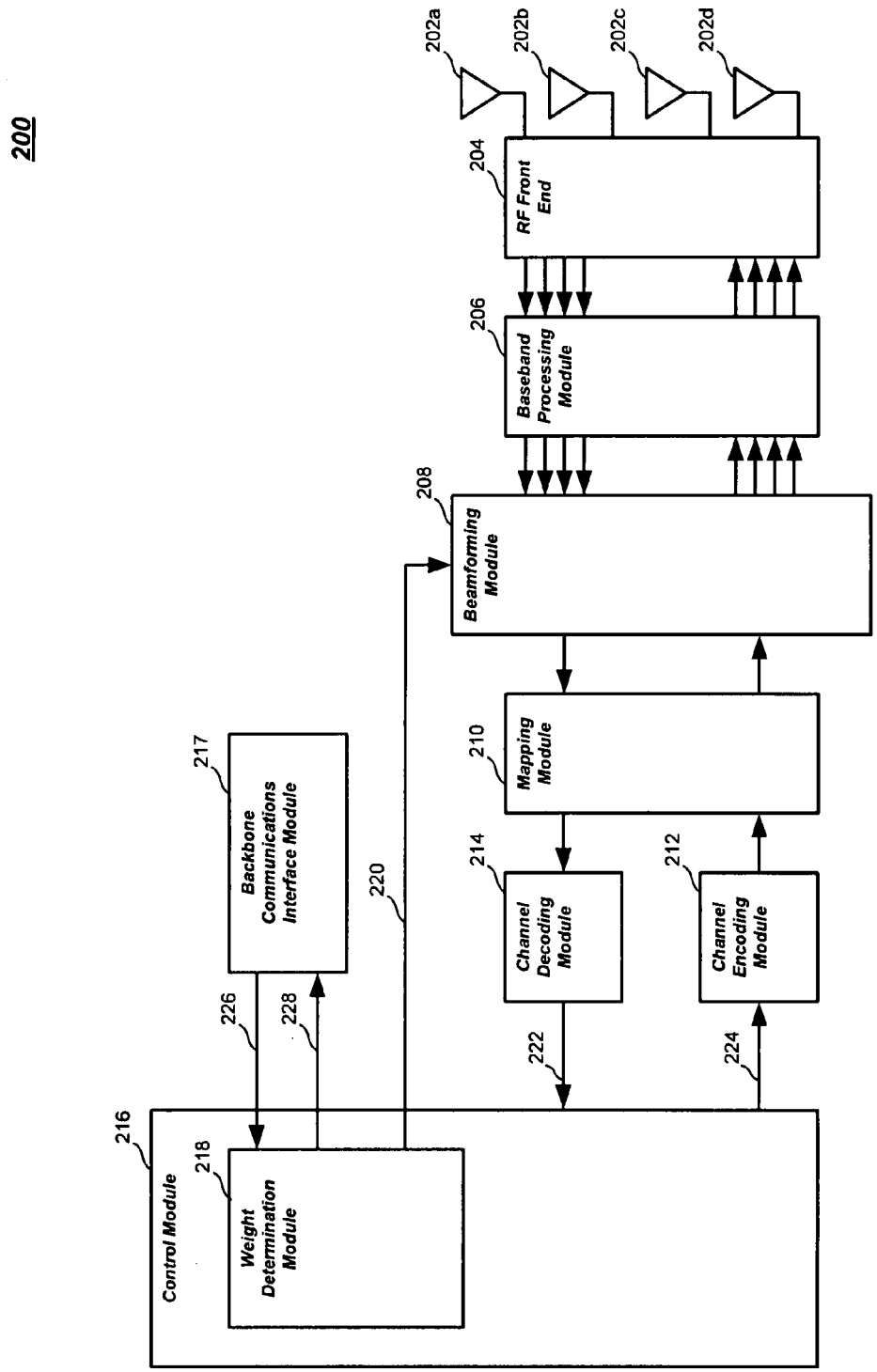
FIG. 2 is a diagram of an exemplary base station.

FIG. 2 is a diagram showing an implementation of an exemplary base station 200. With reference to FIG. 1, this implementation may be employed for base stations 102a and 102b. The embodiments, however, are not limited to this implementation.

Base station 200 may include various elements. For instance, FIG. 2 shows base station 200 including antennas 202a-d, a radio frequency (RF) front end 204, a baseband processing module 206, a beamforming module 208, a mapping module 210, a channel encoding module 212, a channel decoding module 214, a control module 216, and a backbone communications interface module 217. These elements may be implemented in hardware, software, firmware, or any combination thereof.

For purposes of illustration (and not limitation), FIG. 2 shows base station 200 including four antennas (202a-d). The embodiments, however, are not limited to this number. In fact, any number of antennas may be employed. Through antennas 202a-d, base station 200 may communicate with one or more mobile stations. Such communications may employ the beamforming techniques described herein.

RF front end 204 exchanges signals between antennas 202a-d and baseband processing module 206. In particular, RF front end 204 prepares modulated signals received from baseband processing module 206 for wireless transmission, and prepares received RF signals for processing (e.g., demodulation) by baseband processing module 206. RF front end 204 may include various components (e.g., electronics) such as amplifiers, filters, upconverters, downconverters, diplexers, and/or circulators. However, the embodiments are not limited to these examples.

Baseband processing module 206 receives weighted signals from beamforming module 208 and modulates these signals. For instance, baseband processing module 208 may receive a weighted signal for each of antennas 202a-d. Upon receipt of these signals, baseband processing module 206 performs modulation operations to generate modulated signals corresponding to each of antennas 202a-d. In addition, baseband processing module 206 may convert these modulated signals from digital signals into analog signals and send them to RF front end 204.

Further, baseband processing module 206 receives multiple analog signals from RF front end 204. Each of these signals corresponds to one of antennas 202a-d. Upon receipt of these signals, baseband processing module 206 converts these signals to digital signals and demodulates them.

In embodiments, the modulation and demodulation operations performed by baseband processing module 206 may be in accordance with OFDM or OFDMA techniques. Thus, modulation operations may involve Inverse Fast Fourier Transforms (IFFTs), while demodulation operations may involve Fast Fourier Transforms (FFTs).

Beamforming module 208 may apply a set of weights to signals that are for transmission by base station 200. For instance, beamforming module 208 may apply a set of weights to a signal received from mapping module 210. As a result, beamforming module 208 produces a weighted signal for each of antennas 202a-d. These weighted signals are sent to baseband processing module 206 for processing, as described above.

FIG. 2 shows that the weights applied by beamforming modue 208 are received (as weights 220) from control module 216. For OFDM/OFDMA type systems, these weights comprise a set of weights for each of antennas 202a-d. Each set of weights includes a weight for each subcarrier used at the corresponding antenna. These weights may each be a complex value (i.e., having a magnitude and a phase).

Accordingly, for each set of weights, each subcarrier value for a signal received from mapping module 210 is multiplied by the corresponding subcarrier weight. This results in a weighted signal for each of antennas 202a-d. As described above, these weighted signals are sent to baseband processing module 206. Thus, in embodiments, beamforming is performed in the frequency domain. However, equivalent time domain operations (which correspond to such frequency domain beamforming operations) may be employed as well. Thus, embodiments may employ beamforming in the frequency domain and/or the time domain.

Further, embodiments may perform receive beamforming with nulling. This may involve multiplying signals received from baseband processing module 206 (i.e., a signal for each of antennas 202a-d) by their corresponding weights. As described above, this may involve multiplying subcarrier values with corresponding subcarrier weights. The results of the multiplications for each set of weights may be combined (e.g., summed) to produce a combined signal that is sent to mapping module 210 for further processing.

Mapping module 210 receives bits from channel encoding module 212 and maps them to particular subcarriers. This produces a mapped signal (e.g., a mapped quadrature amplitude modulation (QAM) signal or a mapped phase shift keying (PSK) signal), which is sent to beamforming module 208 for processing, as described herein.

In addition to conveying information received from channel encoding module 212, the signal generated by mapping module 210 may also include beamforming pilots. These beamforming pilots are employed by mobile stations to assess wireless channel characteristics. As described herein, beamforming pilots may comprise predetermined values for one or more predetermined subcarriers. These subcarriers may be distributed over frequency as well as over time.

Further, mapping module 210 receives a combined signal from beamforming module 208 and converts the combined signal to soft bits or symbols. These soft bits or symbols are sent to channel decoding module 214.

Channel encoding module 212 receives an information sequence 224 (e.g., payload data and/or control information) from control module 216. In turn, channel encoding module 212 performs various operations on this sequence. Such operations include randomizing, forward error correction (FEC) encoding, and/or interleaving operations. In turn, channel encoding module 212 provides an encoded signal to mapping module 210 for processing, as described herein.

Channel decoding module 214 may receive soft symbols or bits from mapping module 210. Upon receipt, channel decoding module 214 may perform operations, such as deinterleaving, FEC decoding, and/or de-randomization. Upon performance of such operations, channel decoding module 214 produces a received information sequence 222.

FIG. 2 shows that received information sequence 222 is sent to control module 216. Received information sequence 222 may include data and control information. Such control information may include channel quality indicator (CQI) messages generated by mobile stations.

Backbone communications interface module 217 provides for the exchange of information with other base stations. For instance, backbone communications interface module 217 may send and receive information regarding characteristics of interfering downlink channels, as described herein. This exchange of information among base stations may occur across wired or wireless networks. Moreover, base stations may exchange such information through various network and/or system entities.

Accordingly, backbone communications interface module 217 may include elements, such as network interface cards, electronics, and/or other elements to provide such communications capabilities. These elements may be implemented in hardware, software, firmware, or any combination thereof.

FIG. 2 shows that control module 216 is coupled to channel encoding module 212 and channel decoding module 214. Thus, control module 216 may send and receive information that is exchanged with mobile stations. Accordingly, control module 216 may include components and/or functionality to operate according to one or more protocol layers. Such protocol layers may provide features, such as packet encapsulation/decapsulation, error correction encoding/decoding, signaling, link protocols, and/or media access protocols. However, control module 216 may include other components and/or functionality. In turn, control module 216 may exchange information (e.g., payload data) with higher level protocols and/or application entities (not shown).

FIG. 2 shows that control module 216 includes a weight determination module 218. During operation, control module 216 receives channel quality indicator (CQI) messages from demodulation module 214 and provides them to weight determination module 218. Such CQI messages are sent by mobile stations served by base station 200.

CQI messages may include downlink user channel information, such as frequency response characteristics. Also, in embodiments (e.g., embodiments employing FDD), CQI messages may include downlink interfering channel information, such as frequency response characteristics. This interfering channel information may be sent to backbone communications interface 217 (as interfering channel characteristics 228) for forwarding to associated remote (e.g., neighboring or nearby) base stations, as described below with reference to FIGS. 3 and 4.

FIG. 2 further shows that control module 216 is coupled to backbone communications interface module 217. As described above, backbone communications interface module 217 may receive downlink interfering channel characteristics. Such characteristics are reported by mobile stations served by other base stations. As shown in FIG. 2, this information is sent (as interfering channel characteristics 226) to weight determination module 218. The forwarding of interfering channel characteristics among base stations is described below in greater detail with reference to FIGS. 3 and 4.

Weight determination module 218 determines beamforming weights (e.g., weights 220) for the mobile stations serviced by base station 200. In embodiments, these mobile stations are cell edge stations. These determinations are based on characteristics of various wireless channels. Such determinations may employ the techniques of Equations (3) and (4), and/or (6) and (7) below. The embodiments, however, are not limited to these equations or techniques.

In general operation, weight determination module 218 may generate weights 220 based on downlink channel characteristics. When base station 200 employs time division duplexing (TDD) techniques, such channel downlink characteristics may be determined from uplink transmissions sent by cell edge mobile stations served by base station 200 and from uplink transmissions sent by interfering cell edge mobile stations served by other (nearby) base stations. These uplink transmissions may be used because TDD systems employ the same frequencies for uplink and downlink transmissions. Thus, in TDD systems, uplink channel properties resemble properties of the corresponding downlink channels.

However, when base station 200 employs frequency division duplexing (FDD) techniques, such downlink channel characteristics cannot be determined from uplink transmissions. This is because uplink and downlink channels are no longer reciprocal due to a substantial frequency separation between these channels.

Thus, weight determination module 218 may determine beamforming weights based on downlink user channel information and downlink interfering channel information that is reported by mobile stations and other base stations. More particularly, weight determination module 218 may generate weights 220 based on CQI messages received from baseband channel decoding module 214 and interfering channel information 226 provided by remote base stations.

As described above, the elements of base station 200 may be implemented in hardware, software, firmware, or any combination thereof. Thus, implementations may include one or more processors that execute instructions or control logic stored in a storage medium (e.g., memory). These instructions or control logic may provide features of one or more of the elements of base station 200. The embodiments, however, are not limited to such implementations.

Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

An example of weight calculation for TDD systems is now described. In a TDD system, the weights that a base station uses for downlink beamforming may be derived from uplink transmissions that the base station receives from mobile stations. More particularly, the base station may determine weights based on characteristics of channels from its mobile stations to the base station, as well as on characteristics of channels from interfering mobile stations that are served by other (e.g., nearby or neighboring) base stations to the base station.

Thus, referring again to FIG. 1, base station 102a may determine its beamforming weights based on characteristics of its uplink channel with mobile station 104a, as well as on characteristics of an uplink channel between base station 102a and mobile station 104b (which is an interfering station). The following paragraphs provide a quantitative analysis of such determinations in the context of OFDMA systems. Such analysis, however, may be applied or adapted to other types of systems.

The uplink signal that base station BS_p with M antennas receives from mobile station MS_p_m with N antennas is expressed below in Equation (1).

$$\vec{x}(k) = H_{p\_p\_m}(k)\vec{W}^H_{MS\_p\_m\_UL}s_{p\_m}(k) + \sum_{\substack{q=1,n=1,\\p\neq q}}^{Q,J} H_{p\_q\_n}(k)\vec{W}^H_{MS\_q\_n\_UL}s_{q\_n}(k) + \vec{n}(k) \quad (1)$$

where:
k=subcarrier number in OFDMA symbol;
$\vec{x}(k)$=received vector (having a dimension M×1) at BS_p on subcarrier k;
$s_{p\_m}(k)$=QAM symbol transmitted by desired user MS_p_m;
$H_{p\_p\_m}(k)$=channel frequency response matrix (having dimensions M×N) from user MS_p_m to desired base station (BS_p) at subcarrier k;
$\vec{W}_{MS\_p\_m\_UL}$=mobile station beamforming weight applied by MS_p_m (having dimensions 1×N);
$s_{q\_n}(k)$=QAM symbol of interfering mobile station MS_q_n;
$H_{p\_q\_n}(k)$=channel frequency response matrix (having dimensions M×N) from interfering mobile station MS_q_n to BS_p at subcarrier k;
$\vec{W}_{MS\_q\_n\_UL}$=MS transmit beamforming weight applied by MS_q_n (having dimensions 1×N); and
$\vec{n}(k)$=thermal noise vector (having dimensions M×1) at subcarrier k with mean 0 and variance $\sigma^2 I$ (this parameter can be estimated from the base station receiver noise figure or can be measured by base station BS_p, if desired).

In Equation (1), the uplink mobile station beamforming weights ($\vec{W}_{MS\_p\_m\_UL}$ and $\vec{W}_{MS\_q\_n\_UL}$) are known to base station BS_p. The base station may determine these weights through a variety of techniques, such as channel precoding used in multiple-input multiple-output (MIMO) systems.

The channels of desired and interfering users may be considered constant across a resource block. Hence, for purposes of clarity, the following analysis omits subcarrier index k.

For uplink transmissions, a receive beamformer at base station BS_p employs a weight vector $\vec{w}_{p\_m}$. This weight factor combines the signals received at M antennas, as indicated below in Equation (2).

$$\hat{s}_{p\_m} = \vec{w}_{p\_m}^H \vec{x} \qquad (2)$$
$$= \vec{w}_{p\_m}^H (H_{p\_p\_m}) \vec{W}_{MS\_p\_m\_UL}^H s_{p\_m} +$$
$$\sum_{\substack{q=1, n=1 \\ p \neq q}}^{Q,J} \vec{w}_{p\_m}^H (H_{p\_q\_n}) \vec{W}_{MS\_q\_n\_UL}^H s_{q\_n} + \vec{w}_{p\_m}^H \vec{n}$$

In Equation (2), $(.)^H$ denotes a complex conjugate transpose. The weight vector $\vec{w}_{p\_m}$ of Equation (2) may be derived using minimum mean-square error estimation (MMSE), as shown below in Equation (3).

$$\vec{w}_{p\_m} = R_{xx}^{-1} H_{p\_p\_m} \vec{W}_{MS\_p\_m\_UL} \qquad (3)$$

In Equation (3), $R_{xx} = E(\vec{x}\vec{x}^H)$. $R_{xx}$ may be calculated (assuming that the data and noise are uncorrelated) as expressed in Equation (4), below.

$$R_{xx} = \sigma_s^2 H_{p\_p\_m} \vec{W}_{MS\_p\_m\_UL} \vec{W}_{MS\_p\_m\_UL}^H H_{p\_p\_m}^H + \qquad (4)$$
$$\sigma_s^2 \sum_{\substack{q=1, n=1 \\ p \neq q}}^{Q,J} H_{p\_q\_n} \vec{W}_{MS\_q\_n\_UL} \vec{W}_{MS\_q\_n\_UL}^H H_{p\_q\_n}^H + \sigma^2 I$$

In Equation (4), $\sigma_s^2$ represents the average signal power, which is known.

The above analysis indicates that $\vec{w}_{p\_m}$ is calculated based on received uplink signals. In turn, $\vec{w}_{p\_m}$ is applied to a downlink transmitted signal, which is expressed below in Equation (5) as $\vec{z}$.

$$\vec{z} = \frac{\vec{w}_{p\_m}^H}{|\vec{w}_{p\_m}|} s_{p\_m} \qquad (5)$$

The employment of transmit beamforming with nulling for downlink transmissions provides improved system performance. For instance, analysis and simulations indicate that such techniques provide significant improvements in spectral efficiency.

For TDD systems, the frequency response of a downlink channel is the transpose of the corresponding uplink channel. Thus, for TDD systems, $H_{p\_p\_m}^{DL} = (H_{p\_p\_m})^T$.

However, as described above, a base station employing FDD cannot calculate beamforming weights based on characteristics of received uplink transmissions. This is because a substantial separation typically exists between downlink and uplink frequencies. As a result, downlink and uplink channels exhibit very different channel states. Thus, embodiments (such as ones employing FDD) may determine beamforming weights for downlink transmissions based on downlink channel characteristics.

For instance, Equations (3) and (4) (provided above) demonstrate calculations of beamforming weights ($\vec{w}_{p\_m}$) that involve uplink channel characteristics $H_{p\_p\_m}$ and $H_{p\_q\_n}$. As described above, $H_{p\_p\_m}$ represents uplink channel characteristics between a desired mobile station and its serving base station, and $H_{p\_q\_n}$ represents uplink channel characteristics between interfering cell edge mobile station(s) and the base station under discussion.

When the above analysis is applied to TDD systems, $H_{p\_p\_m}$ and $H_{p\_q\_n}$ reflect uplink channel characteristics, and $(H_{p\_p\_m})^T$ and $(H_{p\_q\_n})^T$ reflect downlink channel characteristics. These downlink characteristics are also expressed herein as $H_{p\_p\_m}^{DL}$ and $H_{p\_q\_n}^{DL}$.

However, when embodiments apply Equations (3) and (4) to FDD systems, $H_{p\_p\_m}$ and $H_{p\_q\_n}$ only reflect uplink channel characteristics, as $H_{p\_p\_m}^{DL} \neq (H_{p\_p\_m})^T$ and $H_{p\_q\_n}^{DL} \neq (H_{p\_q\_n})^T$.

Therefore, Equations (3) and (4) are adapted to FDD systems, as expressed below in Equations (6) and (7).

$$\vec{w}_{p\_m} = R_{xx}^{-1} (H^{DL}{}_{p\_p\_m})^T \vec{W}_{MS\_p\_m\_UL}^H \qquad (6)$$

$$R_{xx} = \sigma_s^2 (H_{p\_p\_m}^{DL})^T \vec{W}_{MS\_p\_m\_UL}^H \vec{W}_{MS\_p\_m\_UL} (H_{p\_p\_m}^{DL})^* + \qquad (7)$$
$$\sigma_s^2 \sum_{\substack{q=1, n=1 \\ p \neq q}}^{Q,J} (H_{p\_p\_m}^{DL})^T \vec{W}_{MS\_q\_n\_UL}^H \vec{W}_{MS\_q\_n\_UL} (H_{p\_q\_n}^{DL})^* + \sigma^2 I$$

In Equations (6) and (7), $(.)^*$ denotes complex conjugate operation and $\vec{W}_{MS\_p\_m\_UL}$ is the MS beamforming weight applied at MS_p_m that is derived from the downlink channel and is known to BS_p.

Accordingly, embodiments may exchange information among stations to provide base stations with downlink channel characteristics. Further, embodiments may employ various signal formats and/or messages to facilitate this exchange of information. Such exchanged information may include channel quality indicators (CQIs) generated by mobile stations. CQIs provide information regarding downlink channel characteristics from the perspective of the mobile stations.

Current WiMAX CQIs (as well as currently planned WiMAX II CQIs) only provide for the feedback of user channel information from mobile stations to their serving base stations. Thus, referring to Equation (7), such user channel information corresponds to $H_{p\_p\_m}^{DL}$. Unfortunately, such CQI implementations do not provide base stations with characteristics of interfering channels ($H_{p\_q\_n}^{DL}$). Thus, these CQI implementations merely provide base stations with information corresponding to the first term of Equation (7).

In embodiments, each mobile station measures downlink user channel characteristics. Additionally, each mobile station measures downlink interfering channel characteristics from all interfering base stations (from base stations that it can "hear"). For example, mobile station MS_p_m measures $H_{p\_p\_m}^{DL}$ and $H_{q\_p\_m}^{DL}$.

Each mobile station will then report ("feedback") some form of these measurements to its serving base station. As an example, mobile station MS_p_m will report $H_{p\_p\_m}^{DL}$ and $H_{q\_p\_m}^{DL}$ to base station BS_p.

Each serving base station will then exchange received interfering channel measurements with its fellow base stations. For example, a serving base station (BS_p) may forward $H_{q\_p\_m}^{DL}$ and $H_{r\_p\_m}^{DL}$ information measured by its mobile station MS_p_m to the corresponding interferering base stations (i.e., BS_q and BS_r). This feature is described below in greater detail with reference to FIG. 3.

Thus, each base station will collect interfering channel information measured by mobile stations that are served by other base stations. For instance, as described below with reference to FIG. 3, BS_p may receive $H_{q\_p\_m}^{DL}$ and $HD_{r\_p\_m}^{DL}$ information that was measured by mobile station MS_p_m. The $H_{q\_p\_m}^{DL}$ information indicates the forward link interference that BS_q delivers to mobile station MS_p_m, while the $H_{r\_p\_m}^{DL}$ information indicates the forward link interference that BS_r delivers to mobile station MS_p_m.

Figure 3:
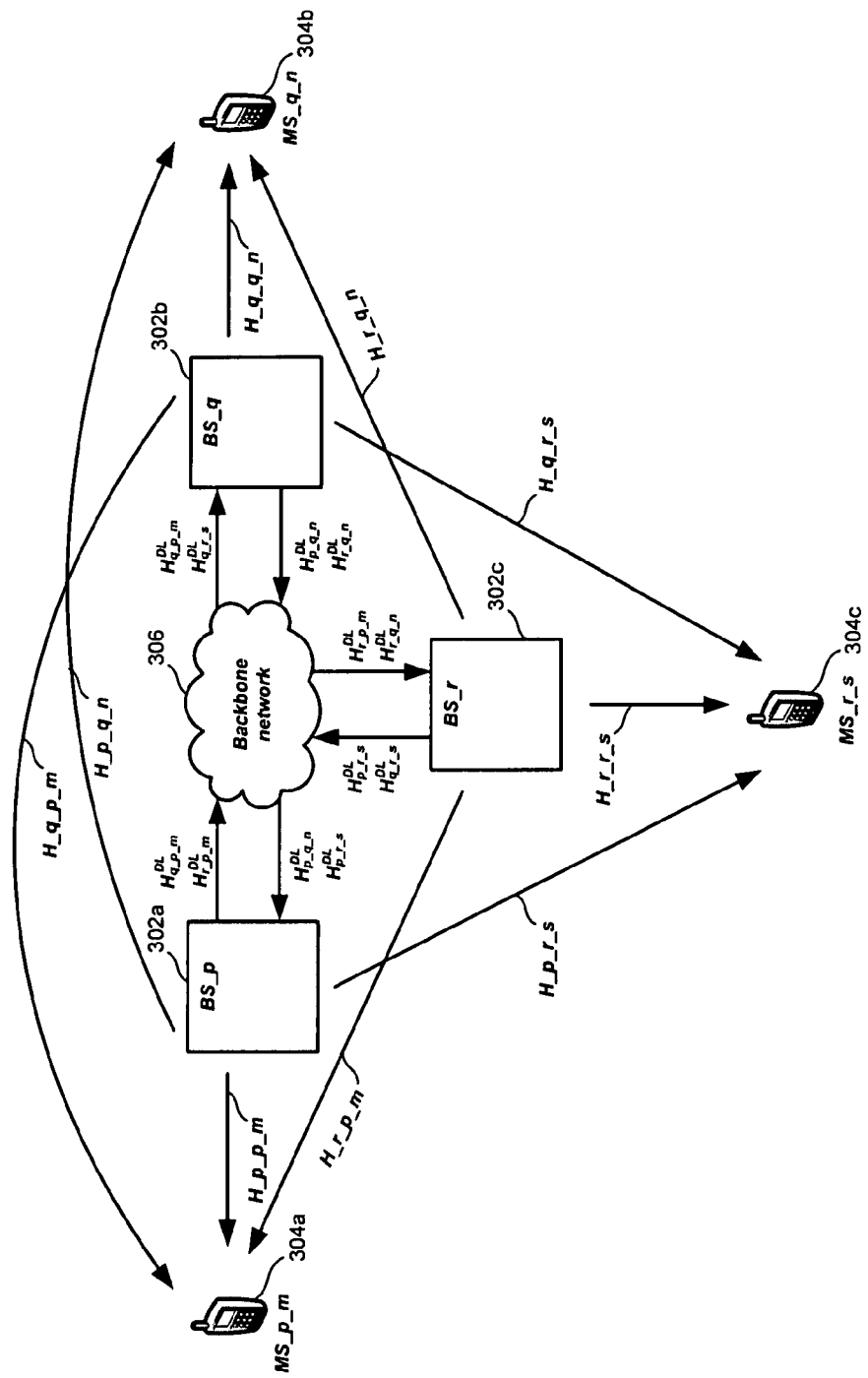
FIG. 3 is a diagram of an exemplary system.

FIG. 3 is a diagram of an exemplary system 300. System 300 may include various elements. For instance, FIG. 3 shows system 300 including base stations 302a-c (also referred to as BS_p, BS_q, and BS_r), mobile stations 304a-c (also referred to as MS_p_m, MS_q_n, and MS_r_s), and a backbone network 306. Thus, the system of FIG. 3 is similar to the environment of FIG. 1 in that it includes BS_p, BS_q, MS_p_m, and MS_q_n. The base stations of FIG. 3 may implemented in the manner described above with reference to FIG. 2. However, other implementations may be employed.

Base station BS_p serves MS_p_m. Accordingly, FIG. 3 shows downlink user channel H_p_p_m between BS_p and MS_p_m. However, FIG. 3 further shows that MS_p_m may also receive transmissions from BS_q and BS_r across downlink interfering channels H_q_p_m and H_r_p_m, respectively.

Base station BS_q serves MS_q_n. This service involves downlink user channel H_q_q_n between BS_q and MS_q_n. Also, MS_q_n may receive transmissions from BS_p and BS_r through downlink interfering channels H_p_q_n and H_r_q_n, respectively.

Base station BS_r serves MS_r_s. Thus, FIG. 3 shows downlink user channel H_r_r_s between BS_r and MS_r_s. Also, MS_r_s may receive transmissions from BS_p and BS_q across downlink interfering channels H_p_r_s and H_q_r_s, respectively.

Each of base stations BS_p, BS_q, and BS_r receive downlink channel information (e.g., frequency response characteristics) from their mobile stations. For example, BS_p receives information from MS_p_n regarding downlink channels H_p_p_m, H_q_p_m, and H_r_p_m. Similarly, BS_q receives from MS_q_n information regarding downlink channels H_q_q_n, H_r_q_n, and H_p_q_n. Likewise, BS_r receives from MS_r_s information regarding channels H_r_r_s, H_p_r_s, and H_q_r_s.

Mobile stations MS_p_m, MS_q_n, and MS_r_s may determine this channel information through beamforming pilots transmitted by the corresponding base stations. Further, this information may be sent from the mobile stations to the base stations in the form of channel quality indicator (CQI) messages. The embodiments, however, are not limited to these examples.

FIG. 3 shows that base stations BS_p, BS_q, and BS_r may be coupled by backbone network 306. Backbone network 306 may include one or more communications networks that allow these base stations to exchange downlink channel information that they receive from their mobile stations. Such communications network(s) may be wired and/or wireless. Referring again to FIG. 2, base stations BS_p, BS_q, and BS_r may each employ a corresponding backbone communications interface module 217 to communicate across backbone network 306. The embodiments, however, are not limited to this context.

As described above, base stations BS_p, BS_q, and BS_r may exchange channel information (such as frequency response characteristics) across backbone network 306. For instance, BS_p, BS_q, and BS_r may exchange downlink interfering channel frequency response characteristics that they receive from their mobile stations. As an example, FIG. 3 shows BS_p sending $H_{q\_p\_m}^{DL}$ to BS_q and $H_{r\_p\_m}^{DL}$ to BS_r. Also, FIG. 3 shows BS_q sending $H_{r\_q\_n}^{DL}$ to BS_r and $H_{p\_q\_n}^{DL}$ to BS_p. Further, FIG. 3 shows BS_r sending $H_{p\_r\_s}^{DL}$ to BS_p and $H_{q\_r\_s}^{DL}$ to BS_q. Through this exchange of information, these base stations may perform beamforming with nulling techniques, as described herein.

Figure 4:
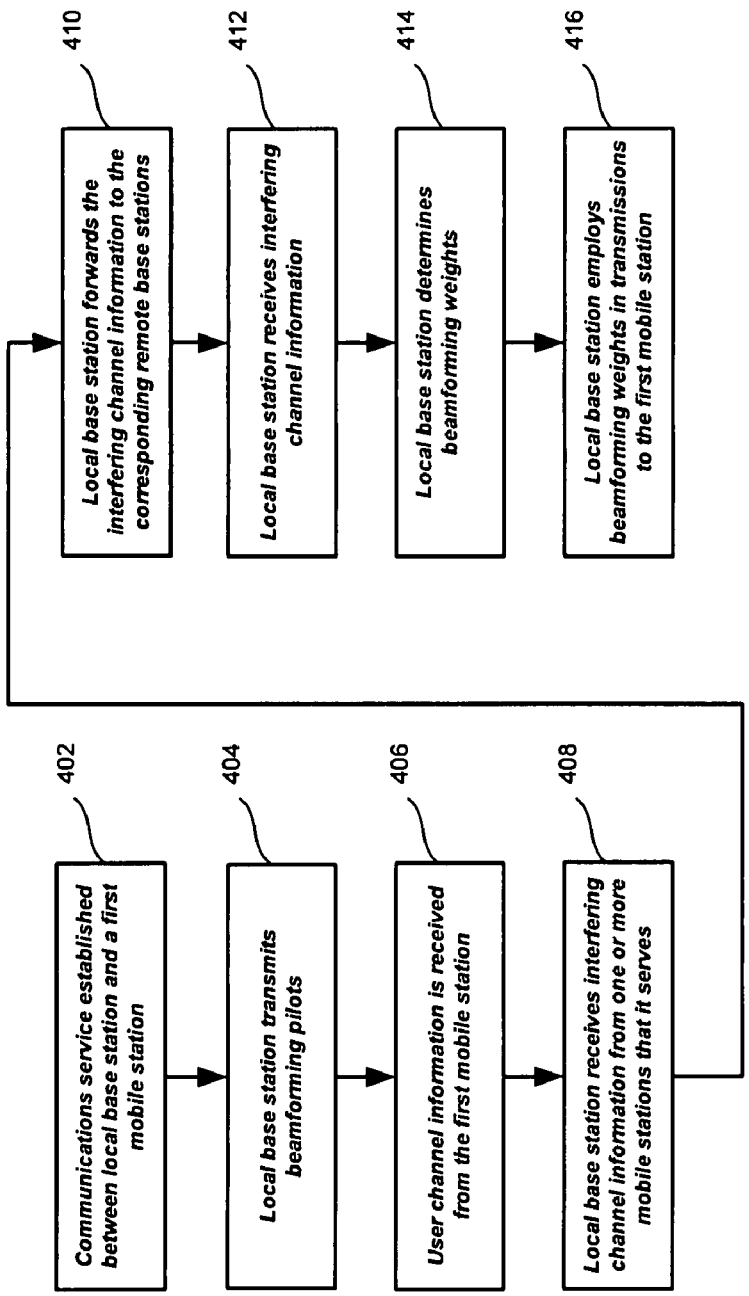
FIG. 4 illustrates an embodiment of a logic flow.

FIG. 4 illustrates one embodiment of a logic flow. In particular, FIG. 4 illustrates a logic flow 400, which may be representative of the operations executed by one or more embodiments described herein. Although FIG. 4 shows a particular sequence, other sequences may be employed. Also, the depicted operations may be performed in various parallel and/or sequential combinations.

The logic flow of FIG. 4 involves a local base station and one or more mobile stations are served by the local base station. Thus, these mobile stations receive transmissions from their serving base stations according to beamforming with nulling techniques, as described herein. Thus, in embodiments, these mobile stations are cell edge users. Additionally, the logic flow of FIG. 4 involves one or more remote (e.g., nearby or neighboring) base stations, as well as the mobile station(s) that are served by these remote base station(s).

FIG. 4 shows that, at a block 402, communications service is established between the local base station and a first mobile station. In the context of FIG. 3 the local station may be BS_p and the first mobile station may be MS_p_m. The embodiments, however, are not limited to this context.

At a block 404, the local base station transmits beamforming pilots. These transmissions occur across a downlink user channel between the local base station and the first mobile station. In addition, these transmissions occur across downlink interfering channels between the local base station and one or more other mobile stations. These one or more other mobile stations are served by base stations other than the local base station (remote base stations).

The beamforming pilots are for mobile stations to perform downlink channel characteristic measurements. In embodiments employing OFDM and/or OFDMA, beamforming pilots may comprise predetermined values for one or more predetermined subcarriers. These subcarriers may be distributed over frequency as well as over time (e.g., across multiple OFDM and/or OFDMA symbols). Mobile stations know these predetermined values and predetermined subcarriers. Therefore, mobile stations may determine downlink characteristics based on the received beamforming pilots.

At a block 406, the local base station receives user channel information from the first mobile station. This received user channel information includes characteristics of a downlink user channel between the local base station and the first mobile station. The first mobile station may determine or measure these characteristics based on the beamforming pilots that it receives from the local base station.

The downlink user channel characteristics may include frequency response characteristics. For example, with reference to Equations (6) and (7) above, this information may include (or indicate) $H_{p\_p\_m}^{DL}$.

At a block 408, the local base station receives interfering channel information measured by its own mobile stations. This information includes characteristics of one or more downlink interfering channels. Each of these downlink channels is between a remote base station and mobile station served by the local base station. For example, with reference to FIG. 3, base station BS_p may receive, from mobile station MS_p_m, characteristics of an interfering channel between BS_q and MS_p_m and/or characteristics of an interfering channel between BS_r and MS_p_m. These interfering channel characteristics may include frequency response characteristics. Thus, with reference to Equations (6) and (7) above, this information may include (or indicate) $H_{q\_p\_m}^{DL}$ and $H_{r\_p\_m}^{DL}$. The embodiments, however, are not limited to these examples.

At a block 410, the local base station forwards the interfering channel information received by the local base station at block 408 to the corresponding remote base stations. Thus, referring again to the example of FIG. 3, this may involve BS_p forwarding $H_{q\_p\_m}^{DL}$ to base station BS_q and BS_p forwarding $H_{r\_p\_m}^{DL}$ to BS_r. These remote base stations may employ this information (along with user channel information received from their own mobile stations) in their determination of beamforming weights, as described herein. In embodiments, the local base station may forward this information across a backbone network, such as backbone network 306.

FIG. 4 further shows that, at a block 412, receives interfering channel information regarding one or more mobile stations served by other (remote) base stations. More particularly, this information includes characteristics (e.g., frequency responses) of one or more downlink channels is between the local base station and mobile station(s) served by remote base station(s). Thus, this information may be based on the beamforming pilots transmitted by the local base station and received across downlink interfering channels.

Thus, in the context of FIG. 4, block 412 may comprise BS_p receiving $H_{p\_q\_n}^{DL}$ and $H_{p\_r\_s}^{DL}$, (or indications thereof). The local base station may receive this information from the remote base station(s) that serve these mobile device(s). Thus, block 412 may involve receiving this information from a backbone network, such as backbone network 306. The embodiments, however, are not limited to these examples.

As shown in FIG. 4, the local base station determines beamforming weights at a block 414. These beamforming weights are for transmissions across the downlink channel with the mobile station. The determination of these weights is based on the information received at blocks 406 and 412. For instance, these weights may be determined in accordance with Equations (6) and (7), provided above. The embodiments, however, are not limited to this weight determination technique.

The local base station employs the beamforming weights in one or more transmissions to the first mobile station at a block 416. As described herein, such weights may provide for improved SINR performance and increased data rates.

Figure 5:
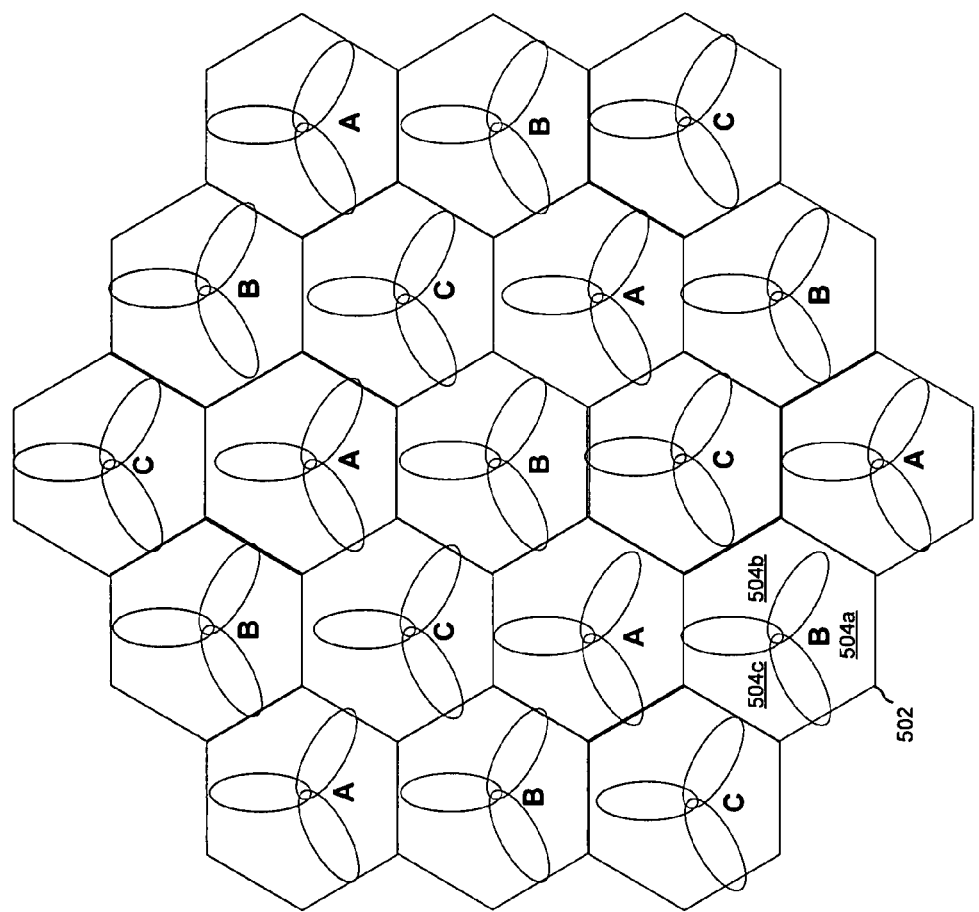
FIG. 5 is a diagram of an exemplary operational scenario.

FIG. 5 is a diagram of an operational scenario 500. This scenario involves multiple cells, which are depicted as hexagons. For example, FIG. 5 shows that this scenario includes a cell 502 having sectors 504a, 504b, 504c. It is apparent from this drawing that scenario 500 includes several similar cells.

However, each cell in FIG. 5 is designated with one of three letters: "A", "B", or "C". These letters indicate a particular beamforming pilot allocation. Thus, the scenario of FIG. 5 employs re-use of three allocations. This scenario is representative of a typical dense urban cellular deployment that employs re-use, and is useful for worst case analysis purposes.

As described above, base stations transmit beamforming pilots so that mobile stations may measure downlink channel characteristics. Thus, in embodiments, each cell 502 provides three sets of beamforming pilots (one set for each sector). Moreover, three sets of beamforming pilots are needed for each of allocations "A", "B", and "C". Therefore, the scenario of FIG. 5 employs nine (3×3) distinct sets of beamforming pilots. In embodiments, these sets are either separated in time and/or in frequency. This arrangement allows sector cell edge users to measure information from nearby interfering base stations will little or no interference.

As described above, beamforming pilots may comprise values sent in multiple OFDM and/or OFDMA subcarriers. Within each beamforming pilot set, an exemplary number of total subcarriers for effective operation is expressed below in Equation (8).

$$N = \frac{2 \cdot M \cdot B \cdot 0.85}{C} \qquad (8)$$

In Equation (8), M is the number of beamforming antennas employed by the base station, B is the signal bandwidth used by the base station, and C is the coherence bandwidth (e.g., 200 kHz). The coefficient 0.85 reflects that the base station employs a 15% guard band. However, other guard bands may be employed. Equation (8) employs coherence bandwidth, C, in order to cover sufficient frequency and spatial span.

Thus, for base stations that each employ a 10 MHz signal bandwidth (channel) and that each have four beamforming antennas, Equation (8) yields 340 beamforming pilots for each beamforming pilot set. Accordingly, nine distinct beamforming pilot sets include 3060 beamforming pilots.

As described above, embodiments employ transmit beamforming with nulling techniques for downlink transmissions to cell edge stations. These stations are typically stationary or have low mobility (e.g., velocities of less than 5 kilometers per hour). Thus, downlink channels with such devices remain relatively constant over periods of time. For example, such channels may stay relatively constant over durations greater than five frames of 5 milliseconds each.

Therefore, embodiments may distribute transmission of beamforming pilots by base stations over intervals of time. For example, the 3060 beamforming pilots of the nine beamforming pilot sets described above may be allocated over multiple consecutive downlink frames. Thus, systems employing this number of beamforming pilots may allocate the 3060 beamforming pilots over five consecutive downlink frames.

Thus, for FDD systems employing this number of beamforming pilots, the 3060 beamforming pilots may be allocated over five consecutive downlink frames of five milliseconds each. This yields 13 (i.e., ceiling(3060/(5×48))) subcarriers per OFDMA symbol over the five consecutive downlink frames. Thus, for each OFDMA symbol, an overhead is added of approximately 1.27% (i.e., 100%×(13/(1024))) for a 10 MHz channel FDD system that employs 15% guard bands.

For TDD systems employing this number of beamforming pilots, the 3060 beamforming pilots may be allocated over five consecutive downlink subframes of 2.5 milliseconds each. This yields 26 (i.e., ceiling(3060/(5×24))) subcarriers per OFDMA symbol over the five consecutive downlink frames. Thus, for each OFDMA symbol, an overhead is added of approximately 2.54% (i.e., 100%×(26/(1024))) for a 10 Mz channel TDD system that employs 15% guard bands.

Figure 6:
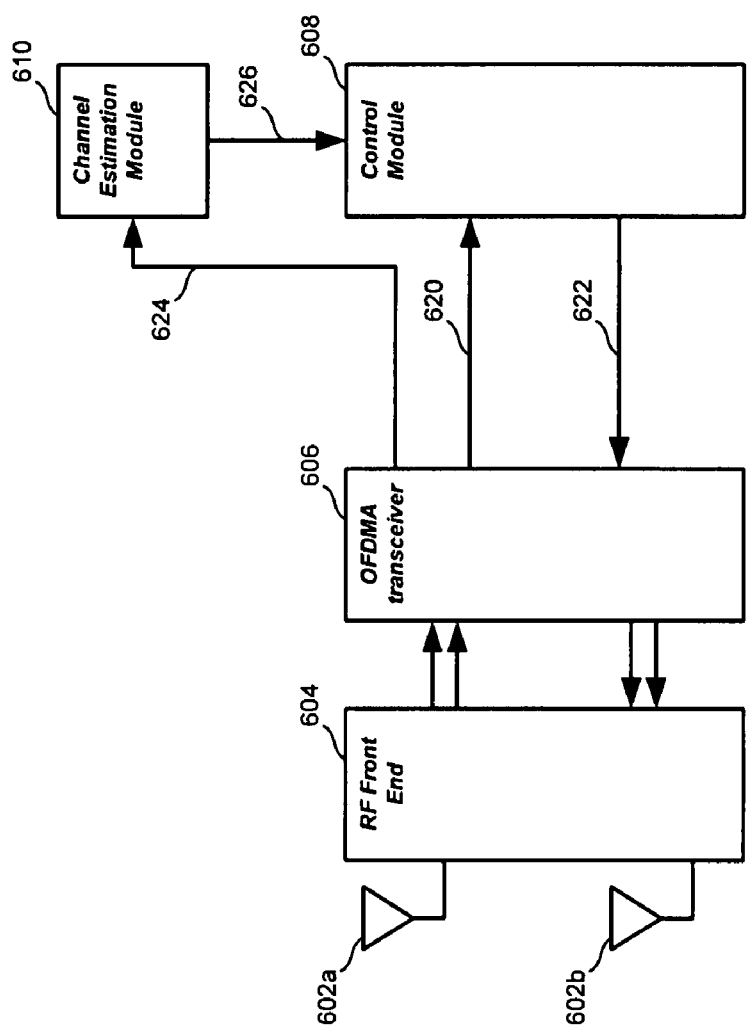
FIG. 6 is a diagram of an exemplary mobile station.

FIG. 6 is a diagram showing an implementation of an exemplary mobile station 600. This implementation may be employed for mobile stations described herein (e.g., with reference to FIGS. 1, 3, and 4). The embodiments, however, are not limited to this implementation.

Mobile station 600 may include various elements. For instance, FIG. 6 shows mobile station 600 including antennas 602a-b, a radio frequency (RF) front end 604, an OFDMA transceiver 606, a control module 608, and a channel estimation module 610. These elements may be implemented in hardware, software, firmware, or any combination thereof.

For purposes of illustration (and not limitation), FIG. 6 shows mobile station 600 including two antennas (602a-b). The embodiments, however, are not limited to this number. In fact, any number of antennas may be employed. Through antennas 602a-b, mobile station 600 may communicate with a serving base station.

RF front end 604 exchanges signals between antennas 602a-b and OFDMA transceiver 606. In particular, RF front end 604 prepares modulated signals received from OFDMA transceiver 606 for wireless transmission, and prepares received RF signals for processing by OFDMA transceiver 606. RF front end 604 may include various components (e.g., electronics) such as amplifiers, filters, upconverters, downconverters, diplexers, and/or circulators. However, the embodiments are not limited to these examples.

OFDMA transceiver 606 receives (from RF front end 604) a signal for each of antennas 602a-b. Upon receipt, OFDMA transceiver 606 may demodulate, combine, and process these signals to produce a received information sequence 620. As shown in FIG. 6, information sequence 620 is sent to control module 608.

Also, OFDMA transceiver 606 receives (from control module 608) an information sequence 622. OFDMA transceiver 606 may process, modulate, and apply beamforming techniques to this sequence. As a result, OFDMA transceiver 606 produces a signal for each of antennas 602a-b. These signals are sent to RF front end 604, which prepares them for wireless transmission via antennas 602a-b.

In addition, OFDMA transceiver 606 provides received beamforming pilots 624 to channel estimation module 610. Beamforming pilots 624 (which are conveyed in wireless signals received by antennas 602a-b) include subcarrier components according to predetermined scheme(s), such as the ones described herein with reference to FIG. 5. Accordingly, beamforming pilots 624 may include pilots corresponding to a downlink user channel, as well as pilots corresponding to any downlink interfering channels.

From beamforming pilots 624, channel estimation module 610 determines frequency responses for the downlink user channel, as well as to any downlink interfering channels. In embodiments, such determinations may involve dividing received pilot subcarrier values with the predetermined (actual) pilot subcarrier values. Such determinations are sent to control module 608, as frequency response information 626.

As described above, control module 608 exchanges information sequences 620 and 622 with OFDMA transceiver 606. Thus, control module 608 may exchange information with its serving base station. Accordingly, control module 608 may include components and/or functionality to operate according to one or more protocol layers. Such protocol layers may provide features, such as packet encapsulation/decapsulation, error correction encoding/decoding, signaling, link protocols, and/or media access protocols. However, control module 608 may include other components and/or functionality.

In turn, control module 608 may exchange information (e.g., payload data) with higher level protocols and/or application entities (not shown).

Moreover, control module 608 may include frequency response information 626 in information sequence 622. For instance, control module 608 may include this information in the form of one or more CQI messages.

As described above, the elements of mobile station 600 may be implemented in hardware, software, firmware, or any combination thereof. Thus, implementations may include one or more processors that execute instructions or control logic stored in a storage medium (e.g., memory). This storage medium may be implemented as described above with reference to FIG. 2. The instructions or control logic stored in the storage medium may provide features of one or more of the elements of mobile station 600. The embodiments, however, are not limited to such implementations.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Thus, it should be understood that the various embodiments described herein have been presented by way of example only, and not in limitation. For instance, embodiments are not limited to WiMAX or WiMAX II implementations. Further, embodiments are not limited to implementations employing OFDM or OFDMA transmission techniques.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing", "computing", "calculating", "determining", or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising: a beamforming module to apply beamforming weights to a downlink user channel from a base station to a first mobile station; and a weight determination module to determine beamforming weights based on user channel information and interfering channel information; wherein the user channel information is received by the base station from the first mobile station and includes characteristics of the downlink user channel; and wherein the interfering channel information includes characteristics of one or more downlink interfering channels received by the base station from one or more further mobile stations, the downlink interfering channels associated with transmissions across the downlink user channel with the first mobile station; and wherein a communications interface module is to send further interfering channel information to one or more base stations, wherein the further interfering channel information includes characteristics of one or more further downlink interfering channels, each of the further downlink interfering channels between a non-serving base station and the first mobile station.

2. The apparatus of claim 1, wherein the user channel information includes frequency response characteristics of the downlink user channel.

3. The apparatus of claim 1, wherein the interfering channel information includes frequency response characteristics of the one or more downlink interfering channels.

4. The apparatus of claim 1, further comprising a modulation module to generate a plurality of beamforming pilots, the beamforming pilots for determining downlink channel characteristics.

5. The apparatus of claim 1, further comprising the communications interface module to receive the interfering channel information from one or more base stations.

6. The apparatus of claim 1, wherein the downlink user channel conveys orthogonal frequency division multiplexing (OFDM) and/or orthogonal frequency division multiplexing (OFDMA) signals.

7. A method, comprising:
receiving user channel information from a first mobile station, the user channel information including characteristics of a downlink user channel between a local base station and the first mobile station;
receiving interfering channel information, wherein the interfering channel information includes characteristics of one or more downlink interfering channels between the local base station and one or more further mobile stations, the one or more further mobile stations served by one or more remote base stations;
determining beamforming weights for the downlink channel with the mobile station based on the user channel information and the interfering channel information;
receiving further interfering channel information from the first mobile station, wherein the further interfering channel information includes characteristics of one or more further downlink interfering channels, each of the further downlink interfering channels between a non-serving base station and the first mobile station; and
sending the further interfering channel information to the non-serving base station.

8. The method of claim 7, wherein the interfering channel information is received from the one or more remote base stations.

9. The method of claim 7, wherein the user channel information comprises frequency response characteristics of the downlink user channel and noise characteristics of the downlink user channel.

10. The method of claim 7, wherein the interfering channel information comprises frequency response characteristics of the one or more downlink interfering channels.

11. The method of claim 7, further comprising employing the beamforming weights in one or more transmissions to the first mobile station.

12. The method of claim 7, further comprising transmitting a plurality of beamforming pilots, the beamforming pilots for determining downlink channel characteristics.

13. A system, comprising:
a backbone network; and
a base station to:
receive downlink user channel information and downlink interfering channel information from one or more mobile stations served by the base station,
send, across the backbone network, the downlink interfering channel information to one or more remote base stations;
receive, through the backbone network, further downlink interfering channel information from one or more remote base stations, and determine beamforming weights based on the user channel information, the interfering channel information, and the further interfering channel information.

14. The system of claim 13, wherein the base station is assigned one of a plurality of beamforming pilot allocations, and the base station is to transmit beamforming pilots in accordance with the assigned beamforming pilot allocation.

15. The system of claim 14, further comprising the one or more mobile stations;
wherein each the one or more mobile stations is to receive the beamforming pilots from its corresponding base station, and determine the downlink user channel characteristics from the beamforming pilots.

16. An article comprising a non-transitory computer-readable storage medium containing instructions that if executed enable a system to:
receive user channel information from a first mobile station, the user channel information including characteristics of a downlink user channel between a local base station and the first mobile station;
receive interfering channel information, wherein the interfering channel information includes characteristics of one or more downlink interfering channels between the local base station and one or more further mobile stations, the one or more further mobile stations served by one or more remote base stations;
determine beamforming weights for the downlink channel with the mobile station based on the user channel information and the interfering channel information;
receive further interfering channel information from the first mobile station, wherein the further interfering channel information includes characteristics of one or more further downlink interfering channels, each of the further downlink interfering channels between a non-serving base station and the first mobile station; and
send the further interfering channel information to the non-serving base station.

17. The article of claim 16, wherein the storage medium contains instructions that if executed enable a system to:
send the interfering channel information to the one or more remote base stations.

* * * * *

UNITED STATES PATENT AND TRADEMARK OFFICE
CERTIFICATE OF CORRECTION

| | | |
|---|---|---|
| PATENT NO. | : 8,085,653 B2 | Page 1 of 1 |
| APPLICATION NO. | : 11/852277 | |
| DATED | : December 27, 2011 | |
| INVENTOR(S) | : Wendy C. Wong et al. | |

It is certified that error appears in the above-identified patent and that said Letters Patent is hereby corrected as shown below:

IN THE CLAIMS:

In column 17, line 55, in claim 1, after "channel;" delete "and".

In column 19, line 10, in claim 15, delete "each the" and insert -- each of the --, therefor.

Signed and Sealed this
Sixth Day of March, 2012

David J. Kappos
*Director of the United States Patent and Trademark Office*